(12) United States Patent
VA Wijnoogst et al.

(10) Patent No.: US 8,257,763 B2
(45) Date of Patent: Sep. 4, 2012

(54) PROCESS FOR MANUFACTURE OF FEED FOR AQUACULTURE SPECIES

(75) Inventors: Jacques C. VA Wijnoogst, Wijchen (NL); Freddy Johnsen, Auli (NO)

(73) Assignee: Occurente AS, Auli (NO)

( * ) Notice: Subject to any disclaimer, the term of this patent is extended or adjusted under 35 U.S.C. 154(b) by 952 days.

(21) Appl. No.: 11/886,562

(22) PCT Filed: Mar. 8, 2006

(86) PCT No.: PCT/NO2006/000086
§ 371 (c)(1),
(2), (4) Date: Sep. 18, 2007

(87) PCT Pub. No.: WO2006/098629
PCT Pub. Date: Sep. 21, 2006

(65) Prior Publication Data
US 2009/0017166 A1   Jan. 15, 2009

(30) Foreign Application Priority Data
Mar. 18, 2005 (NO) .................................. 20051413

(51) Int. Cl.
*A23L 1/30* (2006.01)
(52) U.S. Cl. ............................ 426/72; 426/250; 426/656
(58) Field of Classification Search .................... 426/72, 426/250, 656
See application file for complete search history.

(56) References Cited

U.S. PATENT DOCUMENTS
3,903,275 A * 9/1975 Streiff ............................ 514/157
(Continued)

FOREIGN PATENT DOCUMENTS
| GB | 985613 | | 3/1965 |
| WO | 92/06599 | * | 4/1992 |
| WO | 93/14645 | | 8/1993 |
| WO | 02/28199 | | 4/2002 |

OTHER PUBLICATIONS

National Research Council (U.S.). Committee on Animal Nutrition: Nutrient requirements of fish; National Academies Press, 1993—114 pages.* International Search Report for PCT/NO2006/000086.
International Preliminary Report on Patentability for PCT/NO2006/000086.

*Primary Examiner* — Humera Sheikh
*Assistant Examiner* — Patricia George
(74) *Attorney, Agent, or Firm* — Wenderoth, Lind & Ponack, L.L.P.

(57) ABSTRACT

The present invention comprises a process for producing a feed and a feed product from proteins like fish meal, soybean meal, rape meal, feather meal etc, binders like wheat, starch containing sources etc, lipids being of marine and/or vegetable origin and containing at least one of the conventional additives like minerals, vitamins, enzymes and pigments like astaxanthin. A storage stable intermediate product is manufactured by mixing the protein material with binders and possibly also the minerals which then are extruded, pelletized, granulated and formed into porous pellets suitable for transport or storage. The intermediate product is further processed by introducing a gel containing water and lipids or an emulsion containing water and lipids into the pores in a vacuum chamber, and where vitamins and possibly pigments and enzymes have been mixed with the gel or emulsion prior to introduction to the vacuum chamber, and that the vacuum is released from said chamber and the thus produced feed is transferred to storage or directly to the consumption site, like a fish farm. The new feature of the feed product is that the major part of the water and lipids are present in the form of a gel or emulsion in the pores of an intermediate product containing the proteins, minerals and minor amounts of water and lipids.

15 Claims, 2 Drawing Sheets

U.S. PATENT DOCUMENTS

| | | |
|---|---|---|
| 4,935,250 A | 6/1990 | Cox |
| 4,971,820 A | 11/1990 | Likuski et al. |
| 5,618,574 A * | 4/1997 | Bunch .................... 426/641 |
| 5,716,655 A * | 2/1998 | Hamstra et al. .............. 426/63 |
| 6,013,255 A * | 1/2000 | Edens et al. ............... 424/94.1 |
| 6,083,520 A * | 7/2000 | Toneby ..................... 424/420 |
| 6,083,541 A | 7/2000 | Hamstra et al. |
| 6,136,353 A * | 10/2000 | Munz ....................... 426/281 |
| 6,517,903 B1 | 2/2003 | Schmidt |

\* cited by examiner

PROCESS FOR MANUFACTURE OF FEED FOR AQUACULTURE SPECIES

BACKGROUND OF INVENTION

The present invention relates to a process for manufacture of feed for aquaculture species from proteins like fish meal, soybean meal, rape meal, feather meal etc, binders like wheat, starch containing sources etc, lipids being of marine and/or vegetable origin. Minerals, vitamins, enzymes and pigments like astaxanthin can also be added during the manufacture. The invention also comprises products resulting from the new process.

The most common process for making fish feed like salmon feed, comprises extrusion of the protein raw materials to which water, vitamins, pigments and minerals are added. Some lipids may also be added before extrusion. The extruded porous pellets are then exposed to vacuum and lipids are absorbed into the pores. All these steps take place at the fish feed plant where the final product is dried and packed for later shipment to the fish farm. Though this production process over the years has been optimized and improved, it inherently comprises some quite serious problems resulting in economic implications.

During the extrusion process vitamins and pigments, colouring agents, will partly break down leading to addition of these component in excess in order to end up with the desired amounts in the final product. Therefore expensive, extrusion stable raw materials are sometimes used. Further in order to get a high oil or lipid absorption capacity the extrudate is dried to a water content of 4-6 weight %. Low water content is also necessary for extended shelf life, i.e. get a stable product that can be stored for an extended time. However, for the digestion process in the fish it would be an advantage that the feed had higher water content. But that will cause problems with mould growth if the water content is too high. Higher water content can also play a role by the deterioration of vitamin activity during storage. Another problem experienced with fish feed containing high amounts of oil, is leakage of oil. One way of reducing this problem is to give the feed pellets an extra coating with lipids having a high melting point, but this will increase costs and may decrease the nutritional value of the feed.

One way of attacking the leakage problem is described in the patent application WO2004080201 which relates to fish feed pellets containing up to 55% by weight of lipids. The major part of the lipid being liquid at ambient temperature is absorbed into the extruded pellets until they are saturated. Then the pellets are cooled and a minor part, 0.5-1.5% by weight of the total lipid content is coated on the pellets. This coating consist of 100-17% by weight of a) glyceride or b) fatty acid or c) crude palm oil or mixtures of a), b) and c) and where the components a), b) and c) all have high melting points and 0-83% by weight of lipids being liquid at ambient temperature. The main disadvantage of this process is that it requires an extra cooling and coating step, and with a lipid different from the main lipid source. This will increase the cost of the feed and also decrease the nutritional value. Further there is known from the EP-patent No. 0980213 a process giving pellets of high oil content. A mixture of basic components is extruded for forming a matrix of fish feed pellets together with an additive which is solid under ambient conditions into porous pellets. The additive is a lipid or fatty acid. Oil is then absorbed into the porous pellets. It is preferred that the additive is either a hydrogenated oil derived from animal or plant origin, or a lipid emulsifier such as mono-, di- or tri-glyceride. Though it is claimed that these pellets suffer very little oil leakage during storage and use, the above problem with water content, vitamins and pigments persists. In Norwegian patent No. 307021 there is described a method for reducing loss of vitamins and pigments experienced during the extrusion step. In order to obtain this reduction the vitamins and pigments and even enzymes, protein and antioxidant are added after the extrusion step in a fluid phase and absorbed into the pellets which were dried under vacuum and then the oil with the additives were absorbed into the pellets. Another Norwegian patent No. 316013 describes a process claiming fish feed having high water content. This is obtained by bringing conventional feed pellets containing protein and fat into a water tank which is kept at vacuum such that water can be sucked into the pellets. This process is performed at the fish farm site and the pellets are fed to the pen in aqueous slurry. Vitamins, pigment, and minerals can be added to the water tank. Salt water can also be used in said tank. It is difficult to see how the additives can be dosed accurately and how the fish shall get the correct amounts of these additives.

From U.S. Pat. No. 4,935,250 it is further known pellets having high oil content and where drying during storage is prevented by giving the pellets a special coating. Said coating shall be flexible and soft and this is obtained by using alginate or guar gum and a calcium chloride solution forming a gel. But this does not imply mixing water and oil in the form of a gel to be placed in the pores of the pellets.

BRIEF SUMMARY OF INVENTION

The main object of the invention was to arrive at a flexible process which could produce a feed for aquaculture species having a relatively high content of water and lipid, and at the same time minimize the loss of vitamins, enzymes and pigments, experienced during the extrusion step and storage.

Another object was to achieve a feed having high content of lipids without leakage problems.

A further object was to arrive at a simpler process than the conventional ones by reducing the number of process steps and equipment necessary for producing the feed.

Having studied the problems of degradation and loss of vitamins and pigments experienced in conventional processes, the inventors investigated the possibilities of adding these components as late as possible in the process chain. It was then surprisingly found that all the above problems could be solved by splitting the production of feed in basically two steps. In the first step one would simply mix the protein raw materials like fish meal, soybean meal, rape meal feather meal etc with binders like wheat, starch etc and water and extrude or agglomerate this mixture into porous pellets. These pellets contain substantially no added lipids and no added vitamins and pigments and could therefore be stored for an extended time in bags or silos without any change in quality. This production of a feed intermediate could be performed at a large feed factory. Then in a second step, preferably at the farm site, vitamins, pigments and lipids could be added to the intermediate. Minerals could be added either in the first or second step. In order to achieve even distribution of the vitamins and pigments in the final feed, these components should be dissolved or mixed in the water and lipid components to be brought into the intermediate. The crucial question was then how to get high amounts of both water and lipid into the intermediate and still avoids leakage of lipids during the further handling/storage of the final feed. One tried then to make a mixture of water and lipids, in the desired ratio, and containing the vitamins and pigments and possibly also minerals. The problem was to obtain a stable and fairly stiff mixture which could be absorbed into the pores of the intermediate. It was then found that it was possible to obtain said mixture adding matrix forming agent like starch and stirring said components into a paste or mayonnaise like product which stiffened after some time. The viscosity of this paste could be decreased by heating up the paste. The intermediate product was then placed in a vacuum vessel to which the paste was added and absorbed into the pores. The absorption process was performed in a conventional way and the final feed pellets were cooled to ambient temperature and was ready for transport directly to the fish farming pens or to storage.

DETAILED DESCRIPTION OF INVENTION

Prior to the mixing step for the paste, the water dissolvable vitamins could be added to the water components and the oil soluble vitamins to the lipid component. In feed for salmonides, pigments like astaxanthin, could be added to the lipid and/or water component. It was not necessary to dissolve completely the vitamins and pigment prior to the addition of matrix agent and stirring. In some cases it could also be an advantage to add an enzyme to the feed. This addition could also take place at a very late step of the process, for instance by adding the enzyme to the water component.

A similar approach was to make an emulsion of water and lipid, containing additives like vitamins, enzyme and pigments, and possibly also the minerals. However, it was considered most practical to add the minerals to the intermediate product as there will be now deterioration of the minerals during storage. Then this emulsion could be absorbed into the pellets of the intermediate product. The water and lipid content of the final feed product could then be varied depending on the ratio water:oil of the emulsion, and the type of emulsifier used. Possibly the final stiffness of the emulsion could even be increased by adding a matrix forming agent like starch to the emulsion prior to the absorption step. In order to avoid oil leakage it is essential that the emulsion stays in the pores of the pellets.

It was then started a study for testing absorption of water and oil to feed particles and try to mix water and oil by use of emulsifiers and gelling agents, like starch, to study the possibilities for absorption. The hypothesis was that a mix of water and oil, added a proper emulsifier or gelling agent, should increase absorption of fat, and in addition the feed particles should absorb water.

The main feature of the present invention comprises a process for producing feed for aquatic species from proteins like fish meal, soybean meal, rape meal, feather meal etc, binders like wheat, starch containing sources etc, lipids being of marine and/or vegetable origin and conventional additives like minerals, vitamins and pigments like astaxanthin, comprising manufacture of a storage stable intermediate product by mixing the protein material with binders and possibly also the minerals which then are extruded, pelletized/granulated and formed into porous pellets suitable for transport and storage. The intermediate product is further processed by introducing a gel containing water and lipids or an emulsion containing water and lipids into the pores in a vacuum chamber, and where vitamins and pigments have been mixed with the gel or emulsion prior to introduction to the vacuum chamber, and that the vacuum is released from said chamber and the thus produced fish feed is transferred to storage or directly to the consumption site.

Another feature of the invention is that the gel is formed by mixing water and lipids in ratios ranging from 20-80 weight % water and 80-20 weight % lipid together with starch or gelatine.

According to the invention the emulsion is formed by mixing water and lipid together with an emulsifier in amounts of 0.1-1% of the liquids and that the water and/or lipid contain vitamins and pigments.

Preferably the emulsion is made by performing the mixing at temperatures of 20-80° C.

Most preferably polyglycerol polyricinoleate will be used as an oil-in-water emulsifier.

The intermediate product can be heated to 30-80° C. and exposed to vacuum of 0.1-0.3 Bar in a vacuum chamber whereon the preheated gel or emulsion is introduced and mixed with the pellets and then the vacuum is slowly released.

The invention also comprises a feed where the major part of the water and lipids are present in the form of a gel or emulsion in the pores of an intermediate product containing the proteins, minerals and minor amounts of water and lipids.

The liquid fraction of the gel or emulsion can contain 20-80 weight % water and 80-20 weight % lipids The total amount of water and lipids in the final feed can be 10-40 weight % and 10-40 weight % respectively.

A special feature of the invention is that the vitamins, enzymes and pigments can be present in the gel or emulsion in the pores of the intermediate pellets.

The invention will be further explained and envisaged by the following examples and description of a flow sheet showing a conventional process and one showing the process according to the invention.

Figure 1:
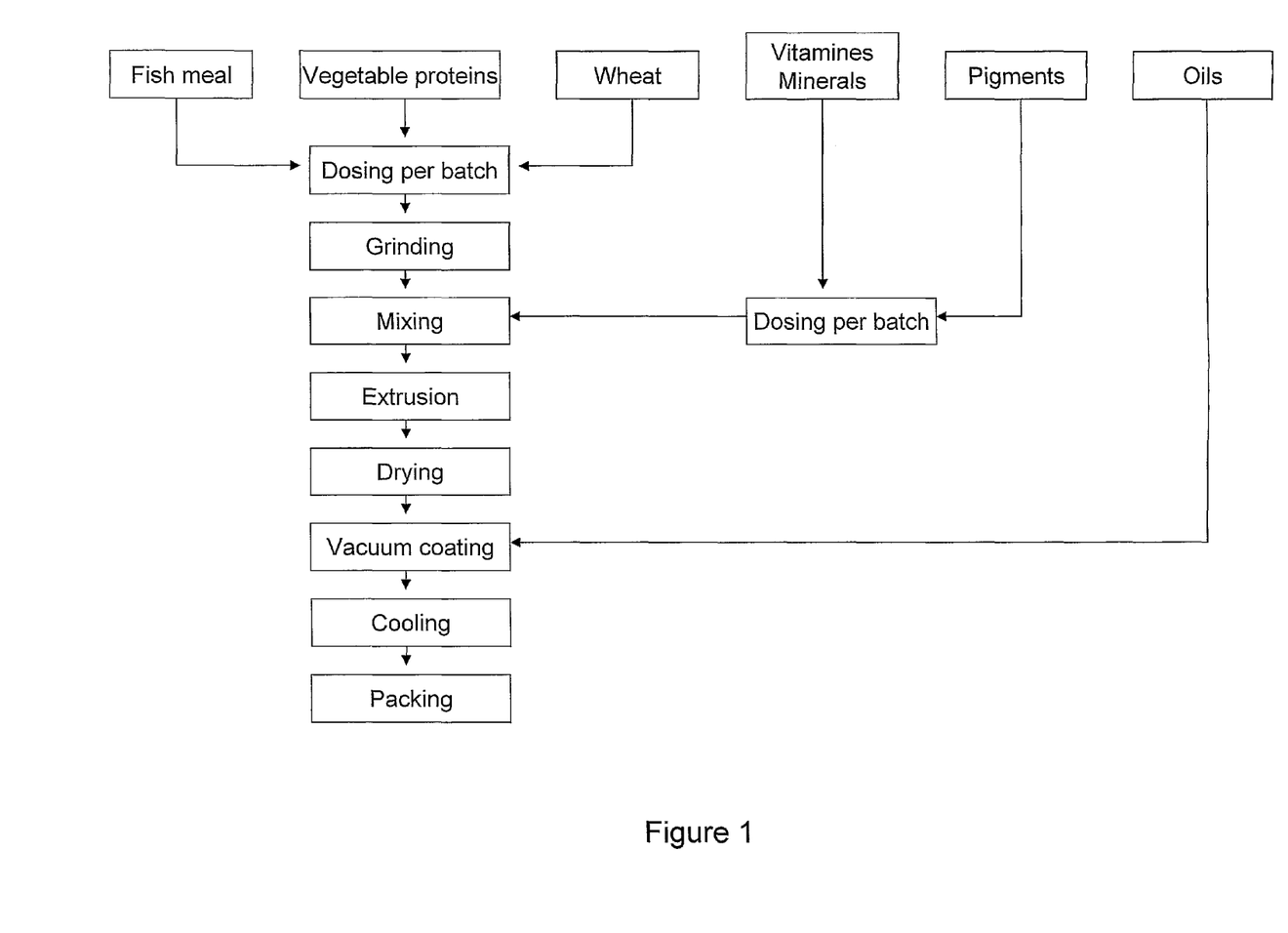
FIG. 1 shows a simplified flow sheet for a conventional process for producing fish feed.

In a conventional process as shown in FIG. 1, one starts by weighing in fish meal, vegetable proteins and wheat for a suitable batch. These raw materials are then grinded to desired fineness and transferred to a mixing step where desired amounts of vitamins, minerals and pigments are added. Necessary amounts of water/steam for obtaining a suitable mass for extrusion are added before and during the extrusion. Said mass is extruded and pelletized to particles which are dried to a water content of 4-6% whereby porous pellets are formed. These pellets are transferred directly to a vacuum chamber where oil/lipids are absorbed into the pores of the pellets which thereby are coated with the desired amount of oil. The coated pellets are then cooled to storage temperature and packed for transport to the various fish farms.

Figure 2:
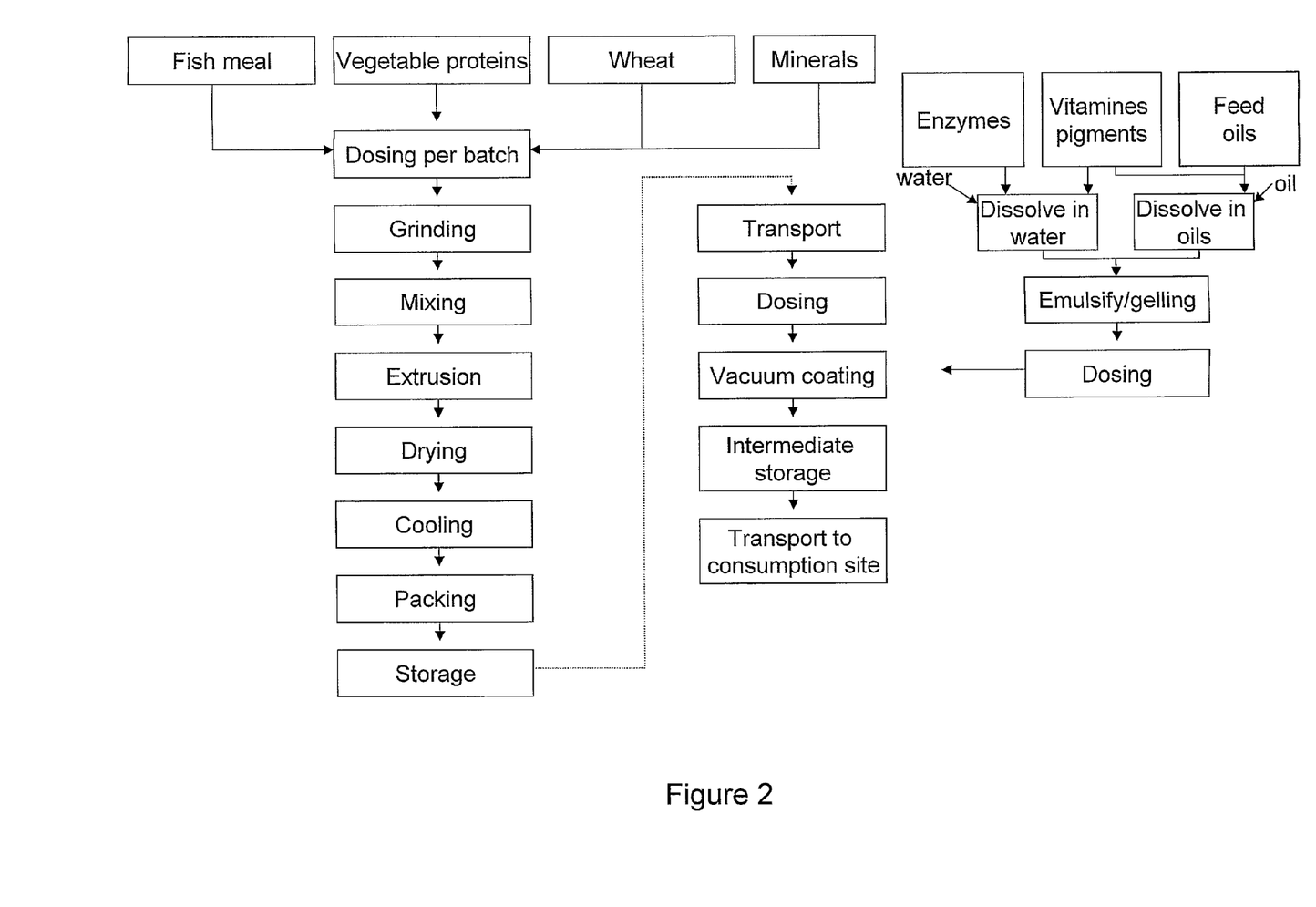
FIG. 2 shows a simplified flow sheet for a process according to the invention.

FIG. 2 shows the process according to the invention where one in a first step produces a pure protein intermediate product. Fish meal, vegetable proteins, wheat and minerals are weighed in to a suitable batch and grinded to desired fineness. The raw materials are then mixed and water/steam is added for forming a mass suited for extrusion and subsequent pelletizing. The pellets are dried and cooled to storage temperature. Thus produced pellets can be stored for an extended time. This intermediate product which does not contain vitamins, pigments and lipids should then be further processed for obtaining a suitable feed product. Said processing may take place at the same site as that for the intermediate product, but it will be more advantages to perform said process where the feed shall be consumed, for instance at a fish farm. Here a batch of the intermediate product is fed to a vacuum chamber whereto desired amounts of a gel or an emulsion are added. Water soluble vitamins and pigments are dissolved in water and oil soluble vitamins and pigments are dissolved in oil/lipids. A gel or emulsion is then formed from said water solution and oil solution. The gel or emulsion is then absorbed into the pores of the intermediate product in the vacuum chamber. Pellets having high contents of both water and oil are thus formed. Subsequent to release of the vacuum, the final pellets are transferred to a suitable vessel for intermediate storage wherefrom the pellets can be transferred to the consumption site, for instance a fish farm.

Feed enzymes like phytases, proteases and enzymes to break down carbohydrates are successfully added to animal feed. The enzymes work in the intestine due to high water levels and optimal temperatures. Effects of feed enzymes in aquatic feed are for the most species limited by low temperatures. Examples are salmon and trout farmed in cold water conditions below 20 degrees C. In average sea temperatures are 8-10 degrees C. in the main farming areas like Norway. The temperature optimum for feed enzymes is from 35-45 degrees C. Low temperatures is accordingly the limiting factor for using feed enzymes in the fish feed. However, by using the technology according to the present invention, the processing temperature is about 40 degrees C. In addition water levels are increased in the pellets.

This technology thus opens for successful treatment by enzymes prior to feeding. Enzymes can be added to the water phase of the emulsion and absorbed into the feed pellets. Then the feed is transported to a holding tank for intermediate storage before feeding. The storage time in the tank can be adjusted for optimal effect of feed enzymes. Optimal conditions for different feed enzymes are known from product definitions.

Example 1

This example shows preparation of oil/water/starch mixture. The intermediate protein products were the same as those used in the example 2 and 3. Sunflower oil was used together with water and starch from Aquatex Cuit 8071 which is extruded peas containing 24% protein and 50% pre-gelatinized starch. In this mixture it was used 3% starch being dissolved in water at 80° C. Having reached a homogeneous product the oil was added resulting in a mayonnaise like product which stays liquid at temperatures below 20° C. This mixture contained 3 grams starch, 50 grams water and 45 grams of oil. The above pellets were then placed in a vacuum vessel where the pressure was set at 200 mBar absolute and the liquid oil/water/starch mix was mixed with the pellets. During this mixing step the pressure was brought back to 1000 mBar absolute in 20 sec and the liquid was pressed into the pores of the pellets. If the pellets are cut with a sharp knife, it can be seen that also the matrix within the pellet has absorbed water, but the structure of the pellet remains. The numerical values from these experiments and further visual evaluation of the final products are given in tables 4, 5 and 6.

It was further found that useful replacements for starch from extruded peas as gel-forming agents would be starch from maize or potato, and gelatine. It was also found that in the gel the amount of water could be 20-80 weight % and the amount of oil could be 80-20 weight %.

Example 2

This example shows absorption into the porous pellets of an emulsion of water and lipid. Two feed products, named Feed I and Feed II, were applied as intermediate products to be treated with the emulsion. Feed I was a carp feed with high levels of carbohydrates and low levels of protein mostly based on vegetable origin. Feed II feed was a trout feed mostly based on fish meal with a high protein level. The feed had a medium particle size, but the density was different. Feed I had a weight per litre of only 334 g and was very fluffy and made to be a floating feed. Feed II was heavier and was not much expanded. This feed was made to be a sinking feed with rather low fat content. Contrary to this a well expanded salmon feed for production of high energy diets, has a weight per litre between 400 g and 450 g. The nutrient content and physical analysis of Feed I and Feed II are shown in Table 1 and Table 2.

TABLE 1

| Feed | % Water | % Protein | % Oil | % Carbohyd. | % Fibre | % Ash |
|---|---|---|---|---|---|---|
| Feed I | 11.8 | 32.6 | 3.9 | 47.3 | 2.3 | 4.4 |
| Feed II | 8.9 | 49.4 | 9.6 | 19 | 3.4 | 9.7 |

TABLE 2

| Feed | Diameter, mm | Length, mm | Weight, g/l |
|---|---|---|---|
| Feed I | 6.5 | 7 | 334 |
| Feed II | 4 | 4-6 | 582 |

Example 3

A number of experiments were run on absorbing emulsions into the two commercial feeds applying the following procedures:

Oil: Vegetable oil mix containing soybean oil, sunflower etc, but in the last experiment cod liver oil was used.

Emulsifier: Oil-in-water (O-i-w) emulsifier: Grinsted PGPR 90, Polyglycerol polyricinoleate, Propylenglycol ester of polycondenced fatty acid from castor oil
  Dosage: 0.5-1.0% of liquid content of emulsion.
  Water-in-oil (w-i-o) emulsifier: Radiamuls Sorb 2157, Polyethoxylated (20 moles) sorbitan mono-oleate 80%.
  Dosage: 0.5-1.0%.

Vacuum Coater:

The vacuum coater was a 7 litre chamber connected to a vacuum pump able to make the necessary vacuum level. The vacuum could be released slowly through a valve. The whole unit could be moved in order to mix the feeds with the emulsion which was added through a valve after the feed was exposed to vacuum conditions.

Procedures:

The first experiments (1-20) were performed at 20° C. and vacuum release time of 20 sec while the rest of the experiments were performed at 40° C. and vacuum release time of 40 sec. The emulsions were made by heating the liquids to 40° C., and then the emulsifier was added to the oil and mixed and then the water was added. In the first experiments the liquids/emulsion were heated to 40° C. while the feed pellets had ambient temperature. The feed and liquids were mixed prior to the addition to the vacuum chamber and the vacuum level was 200 mBar and release time was 20 sec during which mixing was performed. In the final experiments (21-30) both pellets and emulsions were heated to 40° C. and the feed was added to the vacuum chamber prior to mixing with the emulsion. The vacuum was 0.2 mBar and the release time was 40 sec. 400 g of feed pellets were used in all experiments. Some experiments were run with 0.5% and some with 1% emulsifier.

The final pellets were cut with a knife to measure resistance and evaluate visually their consistency. The feeds were analysed with regard to water by standard methods, drying 4 hours at 104° C. and oil was analysed according to AOAC method for fat using HCl treatment prior to ether extraction.

In order to test the potential for absorption of water and oil separately before testing of any emulsions, water and oil was coated until maximum absorption (Table 3). Due to higher expansion, Feed I was able to absorb more water. The maximum was 600 g water to 400 g feed giving a water level in the product above 60% (Table 3). Feed II was able to absorb water until a total water level of 45%. Oil absorption was according to analysis 20.7% in Feed I pellets and 23.7% for the Feed II pellets. The feed products were able to absorb much more water than fat. In a new series of experiments, the maximum levels were retested to be 25% calculated and 22.8% analysed for Feed I and 25.9% calculated and 23.4% analysed for Feed II (Table 5). The maximum absorption of water and fat are shown in Table 3.

TABLE 3

| Experiments | Water or Oil Added, g | Analysis Water % | Oil % | Evaluation* Absorption | Inside | Cut | Comments |
|---|---|---|---|---|---|---|---|
| Feed I Water | | | | | | | |
| 1 | 171.4 | 30.12 | | 10 | 5 | 5 | |
| 2 | 266.7 | 42.93 | | 10 | 7 | 6 | Can do more |
| 3 | 400.0 | 54.43 | | 10 | 9 | 10 | Can do more |
| 4 | 600.0 | 62 | | 10 | 10 | 10 | Max, but spongy |
| Oil | | | | | | | |
| 5 | 171.4 | 7.14 | 23 | 3 | 9 | | Some liquid outside |
| 6 | 133.3 | | | 4 | 8 | | Some liq. outside. > 12 |
| 7 | 112.8 | 8.23 | 20.7 | 6 | 6 | | Still some liq outside |
| Feed II Water | | | | | | | |
| 8 | 171.4 | 29.67 | | 10 | 9 | 8 | No problem |
| 9 | 266.7 | 43.81 | | 10 | 10 | 10 | May be some more |
| 10 | 400.0 | 52.99 | | 10 | 10 | 10 | Surface destroyed |
| Oil | | | | | | | |
| 11 | 171.4 | | | 1 | 10 | | Liq. on outside |
| 12 | 100.0 | 6.45 | 26 | 3 | 10 | | Some liq. outside |
| 13 | 81.9 | | 23.7 | 10 | 10 | | Dry |

*Absorption (10 all absorbed, 1 not absorbed), Inside (10 was filled up, 1 was not filled up), Cut (10 was not resistant, 1 was much resistant)

During these experiments various emulsifiers were tested for finding the best products. The amount of emulsifier was 0.5% of the liquid. In most of the experiments slightly too high amounts of water and oil were added, but one ended up with a level which was possible to absorb (Table 4). However, it was disappointing low levels of oil compared with the experiments with oil only (Table 3). The most important learning was that o-i-w emulsifiers make the liquid hydrophilic. Hydrophilic liquids are expected to be absorbed more simply than hydrophobic fat liquid. Experiments 19 and 20 were pictured adding the same amount of water and oil using o-i-w emulsifier or w-i-o emulsifier. The difference in absorption was visually clear and the conclusion was that o-i-w emulsifiers should be preferred. Table 4 shows the results of testing various emulsifiers and gels (starch from extruded peas). The Table show water and oil added and water and oil absorbed according to analysis.

TABLE 4

| | Oil % | % in dry matter | Water % | Analysis Oil | Water | Comments |
|---|---|---|---|---|---|---|
| Feed II | | | | | | |
| Emulsion 40% oil and 60% water. 0.5% Grinstead PGPR 90 | | | | | | |
| 14 | 21.3 | 27.0 | 26.2 | | | Bad quality, too wet. |
| Emulsion 60% oil and 40% water. 0.5% Radiamuls Sorb 2157 | | | | | | |
| 15 | 22.4 | 27.0 | 16.8 | 15.8 | 23.6 | *Disaster |
| Gel 6% | | | | | | |
| 16 | 21.3 | 27.0 | 20.8 | | | Disaster like 15 |
| Gel 3% | | | | | | |
| 17 | 21.3 | 27.0 | 20.8 | | | Disaster like 15 |
| Emulsion 50% oil and 50% water. 0.5% Grinsted PGPR 90 | | | | | | |
| 18 | 19.5 | 24.1 | 19.0 | 20.1 | 17.8 | |
| Feed I | | | | | | |
| Emulsion 50% oil and 50% water. 0.5% Grinsted PGPR 90 | | | | | | |
| 19 | 18.6 | 24.5 | 24.0 | 16.6 | 18.9 | **Dry |
| Emulsion 50% oil and 50% water. 0.5% Radiamuls Sorb 2157 | | | | | | |
| 20 | | | | | | **Same as 19 |

*Experiment 15: The disaster was due to the fact that it was made all like oil and that is not possible from an absorption point of view.
**Experiment 19 gave a dry product, but surface was liquid. However, it dried up quickly to be OK. Experiment 20 was similar to 19, but the product was immediately stickier and did not absorb so well.

Example 4

Based on the above initial tests the final experiments were run as follows: The feed pellets were heated prior to introduction to the vacuum coater and they were exposed to vacuum prior to addition of the emulsion. Slower vacuum release time was also applied. The maximum oil levels were repeated in order to ensure that one was on maximum level (Table 5 & 6).

The o-i-w emulsifier was added by 1% to the liquids being a mix of 60% oil and 40% water such that the emulsion was coated until maximum absorption (Table 5). Doing this one was able to coat more oil (% of dry matter, DM) on the pellets by using emulsion than by using oil itself. Table 5 and 6 also include experiments using a gel (3% starch from extruded peas) in order to compare the gel concept with the emulsion concept for absorbing both water and fat into the pellets. Combination of gel and emulsion was also tested, but this did not work at all and the idea was discarded.

TABLE 5

| Exp. | Oil Added | Oil % of feed | Oil % of DM | Water Added | Water % of feed | Analysis Water % | Oil % | Oil % of DM |
|---|---|---|---|---|---|---|---|---|
| Feed I | | | | | | | | |
| 21 | 112.8 | 25.8 | 27.6 | | | 9.2 | 9.9* | 22.8 | 25.3 |
| Added emulsion 60% oil and 40% water, 1% Grinsted PGPR 90 | | | | | | | | |
| 22 | 100 | 20.4 | 25.5 | 66.7 | 20.1 | 15.4 | 20.9 | 26.2 |
| 23 | 112.8 | 21.8 | 27.6 | 75.2 | 20.8 | 18.3 | 17.3 | 21.8 |
| 24 | 126.3 | 23.2 | 29.6 | 84-2 | 21.5 | 18.8 | 19.5 | 24.8 |
| 25 | 140.5 | 24.6 | 31.6 | 93.7 | 22.2 | 19.9 | 21.1 | 27.1 |
| 26 | 171.4 | 27.3 | 35.7 | 114.3 | 23.6 | 19.9 | 23.4 | 30.6 |
| Added gel 3% | | | | | | | | |
| 27 | 171.4 | 27.3 | 35.7 | 114.3 | 23.6 | 19.2 | 24.2 | 31.7 |
| Feed II | | | | | | | | |
| 28 | 87.8 | 25.9 | 27.9 | | | 7.3 | 7.4 | 23.4 | 25.2 |
| Added emulsion 60% oil and 40% water, 1% Grinsted PGPR 90 | | | | | | | | |
| 29 | 87.8 | 23.1 | 27.9 | 58.5 | 17.2 | 16.2 | 23.2 | 28 |
| 30 | 100.0 | 24.4 | 29.8 | 66.7 | 18.0 | 17.0 | 24.3 | 29.7 |
| Added gel 3% | | | | | | | | |
| 27 | 100.0 | 24.4 | 29.8 | 66.7 | 18.0 | 15.4 | 23.0 | 28.1 |

*Calculated.

TABLE 6

| Experiments | Comments |
|---|---|
| Feed I | |
| Added only oil | |
| 21 | Max oil absorption |
| Added emulsion 60% oil and 40% water, 1% Grinsted PGPR | |
| 22 | No liquid at the surface |
| 23 | No liquid at the sauce |
| 24 | No liquid at the surface |
| 25 | No liquid at the surface |
| 26 | No liquid at the surface, max. |
| Added gel 3% | |
| | More liquid at the surface and more sticky than 26 |
| Feed II | |
| Oil | |
| 28 | Max oil absorption |
| Added emulsion 60% oil and 40% water, 1% Grinsted PGPR 90 | |
| 29 | No liquid at the surface |
| 30 | No liquid at the surface, max |
| Gel 3% | |
| 27 | More liquid at the surface and more sticky than 30 |

From the above experiments summed up in tables 5 & 6 it can be seen that for Feed I the oil level, as % of dry matter, was increased from 25.3% by adding oil only, to 30.6% by using the emulsion, but at the same time the water level was increased from 9.9% to 19.9%. For Feed II the oil level was increased from 25.2% by using oil only, to 29.7% by using the emulsion while the water content was increased from 7.4% to 17%. Thus the results prove that it is possible to add more oil to fish feed pellets as an emulsion containing 60% oil and 40% water than by using oil alone. The reason can be that fish feed pellets are hydrophilic and use of a hydrophilic emulsion that resembles water will increase the absorption so much that the amount of absorbed oil through the emulsion exceed the amount of absorption of pure oils.

The ability to absorb water in the fish feed pellets was much higher than for oil (Table 3). By using emulsions the water absorbing capacity of the fish feed pellets are utilized. Further it can be seen from the above tables 5 and 6 that addition of oil and water by applying a gel (starch), absorption is indeed achieved, but it is inferior to the results obtained for both Feed I and Feed II when emulsion is applied. In the last experiment the vegetable oil was replaced by high quality cod liver oil in the emulsion. The absorption of the cod liver oil emulsion was similar or seemingly even better than for the vegetable oil mix.

Several other emulsifiers than those used in the above experiments have been evaluated and tested. The main requirement for the emulsifiers is that they are accepted by the authorities for use in feed. Among useful emulsifiers the following can be mentioned: Grinsted PGE 20 Veg, a Polyglycerol esters, Polyglycerol ester from soybean or other others and the polyglycerol moiety is mainly di-, tri- and tetra glycerol, Panodan AB 100 Veg a diacetyl tartaric acid ester of mono-diglycerides made from edible soybean oil, and Grinsted Citrem LR 10 Extra, a citric acid ester of monoglyceride from edible sunflower oil. The amount of emulsifier should be in the range 0.2-1% of the liquids of the emulsion. Both o-i-w and w-i-o emulsifiers were found useful for the purpose though o-i-w emulsifiers will be preferred.

The oil:water ratio in the emulsion can be varied within wide ranges depending on how much oil and water is desired to absorb in the pellet. When high energy levels of oil in final pellets are of importance, it is preferred that the amount of oil is higher than the amount of water in the emulsion. By the above method the total amount of water and oil in the pellets can be 10-30% and 10-40% respectively and most of the water and oil will be present in the pellet pores as an emulsion.

Example 5

This example relates to tests of possible mould growth. The following four samples were made: Sample 1: 400 g of Feed I with 166 g emulsion (100 g oil and 67 g water), Sample 2: 400 g of Feed II with 166 g emulsion (100 g oil and 67 g water), Sample 3: Feed I with same amount of water added as in Sample 1, Sample 4: Feed II with same amount of water as in Sample 2. The four Samples were stored for 10 days at 15° C. and inspected visually. The results are shown in Table 7.

TABLE 7

| Sample | Day 2 | Day 4 | Day 6 | Day 8 | Day 10 |
|---|---|---|---|---|---|
| 1 | No mould | No mould | No mould | No mould | No mould |
| 2 | No mould | No mould | No mould | No mould | No mould |
| 3 | No mould | No mould | No mould | No mould | Light inf. |
| 4 | No mould | No mould | No mould | Light infection | More inf. |

Example 5 shows that by introducing the water in an emulsion, the mould growth will be reduced contrary to introducing the same amount of water directly into the pellets. Even when the pellets contain more than 15% water, no mould was observed after 10 days of storage.

Example 6

This example was made to test stability of an emulsion in sea water and fresh water. An emulsion was made at 40° C. from vegetable oil (60 weight %) and water (40 weight %) using 1 weight % Grinstead PGPR 90 emulsifier and cooled down to about 20° C. 10 grams of emulsion was placed in 100 grams water and 10 grams in 100 grams sea water containing 3.2 weight % sea salt. A layer of emulsion soon separated from the water and made a clear water phase beneath the emulsion which remained as a layer above the water upon standing for 18 hours. This proved that the emulsion was stable and did not break down, even in sea water.

Example 7

This example was made to test possible leakage in sea water and fresh water of additives in an emulsion being present in the pores of pellets of carp feed, here named Feed III. This feed had a specific weight of 444 g/l. Firstly; an emulsion was made from vegetable oil and water using 1 weight % Grinsted PGPR 90 emulsifier. The emulsion was made as in example 6, but in this case astaxanthin and thiamine was added to the aqueous part prior to emulsification. Astaxantin was added in amounts giving 50 PPM in the pellets. The emulsion got a clear pink colour. A measurement tool was established by making dilutions of astaxanthin. The pink colour was possible to read visually down to a concentration of 0.04 PPM in water.

The pink emulsion was added to Feed III in a vacuum vessel and the procedure for this was the same as used in example 6. The emulsion was completely absorbed into the pores of the pellets to such a degree that the pellets had the same colour as before adding the emulsion. 1 g of these pellets was then put in 100 g of sea water and 100 g of fresh water respectively. The colour in the two samples was then read after a few minutes and after 18 hours. It was not possible to see any release of astaxanthin from the pellets. There was observed a slight tendency that salt water stressed the feed more than the fresh water. In order to stress the system even further, 10 g of feed with 50 PPM astaxanthin was added to 100 g of salt water and fresh water. After 1 minute no leakage was observed, but after 5 minutes some signs of astaxanthin were observed in the water. Compared to the above stated dilutions it was estimated that the concentration of astaxanthin was 0.1 PPM, meaning a leakage of 2% of the added astaxanthin from the feed pellets, but this leakage did not increase when the samples were left standing for several hours.

The inventors have by the present invention succeeded in designing a new and flexible process whereby the above problems related to conventional processes have been overcome. A new and improved aquatic feed can be produced by the new process. This product can contain relatively high amounts of oil without any leakage during storage. Another surprising result is that the new product containing high amounts of water (>15%) could be stored for several days without showing any mould growth. The new process also opens up for using enzymes even in aquatic feed.

The invention claimed is:

1. A process for producing a feed for aquatic species, wherein the feed comprises protein, binder, lipid, enzyme, vitamin and pigment, and optionally mineral, said process comprising the steps of:
   (1) producing a storage stable intermediate product at a feed factory by mixing the protein with the binder and optionally the mineral, extruding the resulting mixture into pelletized or granulated porous pellets, and cooling the pelletized or granulated porous pellets, to produce an intermediate product, transporting the intermediate product to a fish farm site, and
   (2) mixing the vitamin, enzyme and pigment with a gel or emulsion containing water or lipid and absorbing the gel or emulsion into pores of the intermediate product in a vacuum chamber under a vacuum, releasing the vacuum from the vacuum chamber and transferring the resulting final feed to a storage site or a consumption site,
   wherein the final feed has a total amount of 15-40 weight % water and a total amount of 10-40 weight % lipid,
   and wherein the final feed has higher mold growth resistance as compared to feed containing the same weight % water not in gel or emulsion.

2. The process according to claim 1, wherein the gel is formed by mixing water, lipid and starch or gelatin,
   wherein the water and lipid are mixed at ratios of 20-80 weight % water and 80-20 weight % lipid.

3. The process according to claim 1, wherein the emulsion is formed by mixing water and lipid together with an emulsifier in an amount of 0.1-2% by weight of the lipid, and wherein the water and/or lipid comprises vitamins and pigments.

4. The process according to claim 1, wherein the protein is at least one member selected from the group consisting of fish meal, soybean meal, rape meal and feather meal.

5. The process according to claim 1, wherein the emulsion contains polyglycerol polyricinoleate as an emulsifier.

6. The process according to claim 1, wherein the binder is at least one member selected from the group consisting of wheat and starch.

7. The process according to claim 1, wherein the lipid is of marine origin and/or vegetable origin.

8. The process according to claim 1, wherein the pigment is astaxanthin.

9. The process according to claim 1, wherein the intermediate product is heated to 20-80° C. and exposed to a vacuum of 0.1-0.3 Bar in the vacuum chamber, preheated gel or emulsion is then introduced into the vacuum chamber and mixed with the intermediated product, and the vacuum is released.

10. Feed pellets comprising protein, lipid, mineral, water, vitamin, pigment and optionally enzyme,
    wherein a major amount of the water and lipid are present in the form of a gel or emulsion in pores of an intermediate product containing the protein, mineral and a minor amount of water and lipid, wherein a liquid fraction of the gel or emulsion contains 20-80 weight % water and 80-20 weight % lipid, wherein the total amount of water and lipid in the feed pellets is 15-40 weight % and 10-40 weight %, respectively, and wherein the feed pellets have higher mold growth resistance as compared to feed containing the same weight % water not in a gel or emulsion.

11. The feed pellets according to claim 10, wherein the gel or emulsion further comprises vitamin and pigment.

12. A process for producing a feed for aquatic species, wherein the feed comprises protein, binder, lipid, enzyme, vitamin and pigment, and optionally mineral, said process comprising the steps of:

(1) providing a storage stable intermediate product wherein the storage table intermediate product was produced by mixing the protein with the binder and optionally the mineral, extruding the resulting mixture into pelletized or granulated porous pellets, and cooling the pelletized or granulated porous pellets, and (2) mixing the vitamin, enzyme and pigment with a gel or emulsion containing water and lipid and absorbing the gel or emulsion into pores of the intermediate product in a vacuum chamber under a vacuum, releasing the vacuum from the vacuum chamber and transferring the resulting final feed to a storage site or a consumption site, wherein the final feed has a total amount of 15-40 weight % water and a total amount of 10-40 weight % lipid, and wherein the final feed has higher mold growth resistance as compared to feed containing the same weight % water not in a gel or emulsion.

13. The process of claim 1, wherein the final feed consists of protein, binder, lipid, enzyme, vitamin and pigment, and optionally mineral.

14. The process of claim 12, wherein the final feed consists of protein, binder, lipid, enzyme, vitamin and pigment, and optionally mineral.

15. The feed pellets of claim 10, wherein the feed pellets consist of protein, binder, lipid, enzyme, vitamin and pigment, and optionally mineral.

* * * * *